US008260980B2

(12) United States Patent
Weber et al.

(10) Patent No.: US 8,260,980 B2
(45) Date of Patent: Sep. 4, 2012

(54) SIMULTANEOUS INTERMEDIATE PROXY DIRECT MEMORY ACCESS

(75) Inventors: Bret S. Weber, Wichita, KS (US); Timothy E. Hoglund, Colorado Springs, CO (US); Mohamad El-Batal, Westminster, CO (US)

(73) Assignee: LSI Corporation, Milpitas, CA (US)

( * ) Notice: Subject to any disclaimer, the term of this patent is extended or adjusted under 35 U.S.C. 154(b) by 217 days.

(21) Appl. No.: 12/482,123

(22) Filed: Jun. 10, 2009

(65) Prior Publication Data
US 2010/0318711 A1    Dec. 16, 2010

(51) Int. Cl.
G06F 13/28 (2006.01)
G06F 15/167 (2006.01)
(52) U.S. Cl. ............... 710/22; 710/23; 710/24; 710/25; 710/26; 710/28; 709/212
(58) Field of Classification Search ............ None
See application file for complete search history.

(56) References Cited

U.S. PATENT DOCUMENTS

| | | | | |
|---|---|---|---|---|
| 5,550,989 A * | 8/1996 | Santos | ............ | 710/306 |
| 5,713,044 A * | 1/1998 | Gillespie et al. | ............ | 710/22 |
| 5,758,182 A * | 5/1998 | Rosenthal et al. | ............ | 710/3 |
| 6,044,225 A * | 3/2000 | Spencer et al. | ............ | 710/52 |
| 6,128,307 A * | 10/2000 | Brown | ............ | 370/412 |
| 6,748,463 B1 * | 6/2004 | Tsuboi et al. | ............ | 710/22 |
| 7,062,591 B2 * | 6/2006 | Pecone | ............ | 710/308 |
| 7,167,951 B2 * | 1/2007 | Blades et al. | ............ | 711/114 |
| 7,194,578 B2 | 3/2007 | McKean et al. | | |
| 7,383,412 B1 * | 6/2008 | Diard | ............ | 711/170 |
| 7,395,460 B2 | 7/2008 | El-Batal | | |
| 7,484,016 B2 * | 1/2009 | Shah et al. | ............ | 710/22 |
| 7,743,189 B2 * | 6/2010 | Brown et al. | ............ | 710/104 |
| 7,769,918 B2 * | 8/2010 | Shah et al. | ............ | 710/22 |
| 2003/0187977 A1 * | 10/2003 | Cranor et al. | ............ | 709/224 |
| 2003/0188054 A1 * | 10/2003 | Yosimoto et al. | ............ | 710/22 |

OTHER PUBLICATIONS

U.S. Appl. No. 12/476,386, filed Jun. 2, 2009.
U.S. Appl. No. 10/826,009, filed Apr. 16, 2004.
U.S. Appl. No. 10/783,785, filed Feb. 20, 2004.
U.S. Appl. No. 10/731,190, filed Dec. 8, 2003.
U.S. Appl. No. 12/259,137, filed Oct. 27, 2008.
PCT Application Serial No. PCT/US08/86468, filed Dec. 11, 2008.

* cited by examiner

Primary Examiner — Henry Tsai
Assistant Examiner — Jing-Yih Shyu
(74) Attorney, Agent, or Firm — Alexander J. Neudeck; Cochran Freund & Young LLC

(57) ABSTRACT

Disclosed is a method that simultaneously transfers DMA data from a peripheral device to a hardware assist function and processor memory. A first DMA transfer is configured to transfer data from the peripheral to a peripheral DMA engine. While receiving the data, the DMA engine simultaneously transfers this data to processor memory. The DMA engine also transfers a copy of the data to a hardware assist function. The DMA engine may also simultaneously transfer data from processor memory to a peripheral device while transferring a copy to a hardware assist function.

3 Claims, 6 Drawing Sheets

TRANSFER A FIRST BLOCK OF DATA FROM A PERIPHERAL DEVICE TO AN ADDRESS RANGE IN PERIPHERAL MEMORY ADDRESS SPACE
302

TRANSFER, CONCURRENTLY WITH TRANSFERRING THE FIRST BLOCK TO AN ADDRESS RANGE IN PERIPHERAL MEMORY ADDRESS SPACE, THE FIRST BLOCK OF DATA TO AN ADDRESS RANGE IN PROCESSOR MEMORY ADDRESS SPACE
304

TRANSFER THE FIRST BLOCK OF DATA TO A HARDWARE FUNCTION
306

FIGURE 3

CONFIGURE A FIRST DMA TRANSFER TO TRANSFER A FIRST BLOCK OF DATA FROM A PROCESSOR MEMORY ADDRESS SPACE TO A PERIPHERAL MEMORY ADDRESS SPACE
502

CONFIGURE A SECOND DMA TRANSFER TO OCCUR CONCURRENTLY WITH THE FIRST DMA TRANSFER
504

TRANSFER THE FIRST BLOCK OF DATA TO A HARDWARE FUNCTION
506

FIGURE 5

SIMULTANEOUS INTERMEDIATE PROXY DIRECT MEMORY ACCESS

BACKGROUND OF THE INVENTION

Mass storage systems continue to provide increased storage capacities to satisfy user demands. Photo and movie storage, and photo and movie sharing are examples of applications that fuel the growth in demand for larger and larger storage systems.

A solution to these increasing demands is the use of arrays of multiple inexpensive disks. These arrays may be configured in ways that provide redundancy and error recovery without any loss of data. These arrays may also be configured to increase read and write performance by allowing data to be read or written simultaneously to multiple disk drives. These arrays may also be configured to allow "hot-swapping" which allows a failed disk to be replaced without interrupting the storage services of the array. Whether or not any redundancy is provided, these arrays are commonly referred to as redundant arrays of independent disks (or more commonly by the acronym RAID). The 1987 publication by David A. Patterson, et al., from the University of California at Berkeley titled "A Case for Redundant Arrays of Inexpensive Disks (RAID)" discusses the fundamental concepts and levels of RAID technology.

RAID storage systems typically utilize a controller that shields the user or host system from the details of managing the storage array. The controller makes the storage array appear as one or more disk drives (or volumes). This is accomplished in spite of the fact that the data (or redundant data) for a particular volume may be spread across multiple disk drives.

SUMMARY OF THE INVENTION

An embodiment of the invention may therefore comprise a method of transferring data, comprising: transferring a first block of data from a peripheral device to an address range in peripheral memory address space; transferring, concurrently with said transferring said first block of data, the first block of data to an address range in processor memory address space; and, transferring the first block of data to a hardware function.

An embodiment of the invention may therefore further comprise a method of mirroring direct memory access (DMA) data to a hardware function, comprising: configuring a first DMA transfer to transfer a first block of data from a peripheral device to a peripheral memory address space; configuring a second DMA transfer to occur concurrently with the first DMA transfer, the second DMA transfer being configured to transfer said first block of data from said peripheral memory address space to a processor memory address space; and, transferring said first block of data to a hardware function.

An embodiment of the invention may therefore further comprise a computer readable medium having instructions stored thereon for mirroring direct memory access (DMA) data to a hardware function, that, when executed by a computer, at least instruct the computer to: configure a first DMA transfer to transfer a first block of data from a peripheral device to a peripheral memory address space; configure a second DMA transfer to occur concurrently with the first DMA transfer, the second DMA transfer being configured to transfer said first block of data from said peripheral memory address space to a processor memory address space; and, transfer said first block of data to a hardware function.

BRIEF DESCRIPTION OF THE DRAWINGS

FIG. 3 is a flowchart illustrating a method of transferring data.

FIG. 5 is a flowchart illustrating a method of mirroring DMA data to a hardware function.

DETAILED DESCRIPTION OF THE EMBODIMENTS

Figure 1:
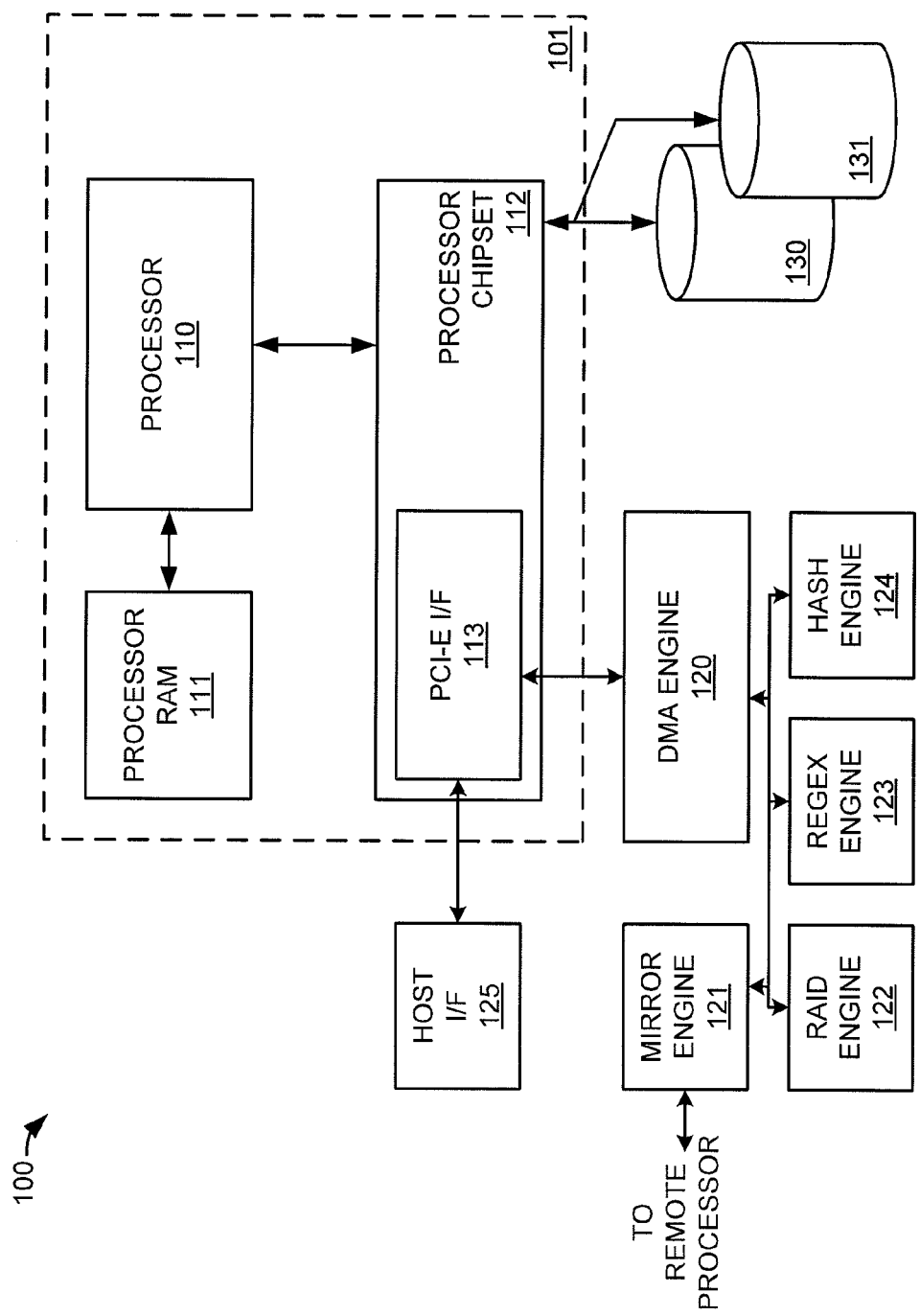
FIG. 1 is a block diagram of a system that performs simultaneous intermediate proxy DMA.

FIG. 1 is a block diagram of a system that performs simultaneous intermediate proxy DMA. In FIG. 1, direct memory access (DMA) system 100 comprises processor 110, processor RAM 111, processor chipset 112, DMA engine 120, mirror engine 121, RAID engine 122, regular expression (regex) engine 123, hash engine 124, host interface 125, disk drive 130, and disk drive 131. Processor 110 is operatively coupled to processor RAM 111. Processor 110 is operatively coupled processor chipset 112. Processor chipset 112 includes PCI-express (PCIe) interface 113. Processor chipset 112 is operatively coupled to disk drives 130-131.

PCI-express interface 113 is operatively coupled to host interface 125. PCI-express interface 113 is operatively coupled to DMA engine 120. DMA engine 120 is operatively coupled to a mirror engine 121, RAID engine 122, regex engine 123, and hash engine 124.

Processor 110, processor RAM 111, and processor chipset 112 may be included on a standard motherboard 101. Thus, DMA engine 120, mirror engine 121, RAID engine 122, regex engine 123, hash engine 124, host interface 125, and disk drives 130-131 may be considered peripherals or host adapters that plug in to motherboard 101. Because motherboard 101 may be an industry standard motherboard it may be relatively inexpensive compared to a custom motherboard.

In an embodiment, host interface 125 may be coupled to a processor or computer system that sends/receives data from DMA system 100. For example, if DMA system 100 is configured as a RAID storage array, host interface 125 may be coupled to a computer system that sends/receives data from disk drives 130-131. DMA system 100 may project one or more logical units to this computer system.

In an embodiment, mirror engine 121 is coupled to remote processor or computer system. This computer system may contain, or comprise, similar functionality to DMA system 100. Thus, data read from, written to, or processed by DMA system 100 may be mirrored to memory associated with another processor. This memory may be in the processor and/or peripheral address space of the other processor. RAID engine 122 may be a hardware function that assists in calculating redundant data for implementing RAID techniques across disk drives 130-131. Regex engine 123 may perform regular expression searching. This regular expression searching may be used for such functions as deep packet inspection (DPI) or virus signature recognition. Hash engine 124 may calculate a hash function to assist with de-duplication. Other hardware functions may be operatively coupled to DMA engine 120 to send/receive proxy DMA data and thus provide hardware assist/acceleration functions to DMA system 100.

In an embodiment, when DMA system 100 transfers data directly from, for example, host interface 125, or disk drives 130-131, it first transfers that data to DMA engine 120. DMA engine 120 transfers the data to one or more of mirror engine 121, RAID engine 122, regex engine 123, and hash engine 124. Concurrent with the DMA engine 120 receiving the data, DMA engine 120 transfers that data to processor chipset 112 to be written to processor RAM 111. This is possible because the connection between PCI-express interface 113 and DMA engine 120 allows the simultaneous unidirectional transfers. Thus, while PCI-express interface 113 sending data via a PCI-express channel to DMA engine 120, DMA engine 120 may send data via another, or the same, PCI-express channel to PCI-express interface 113.

Figure 2:
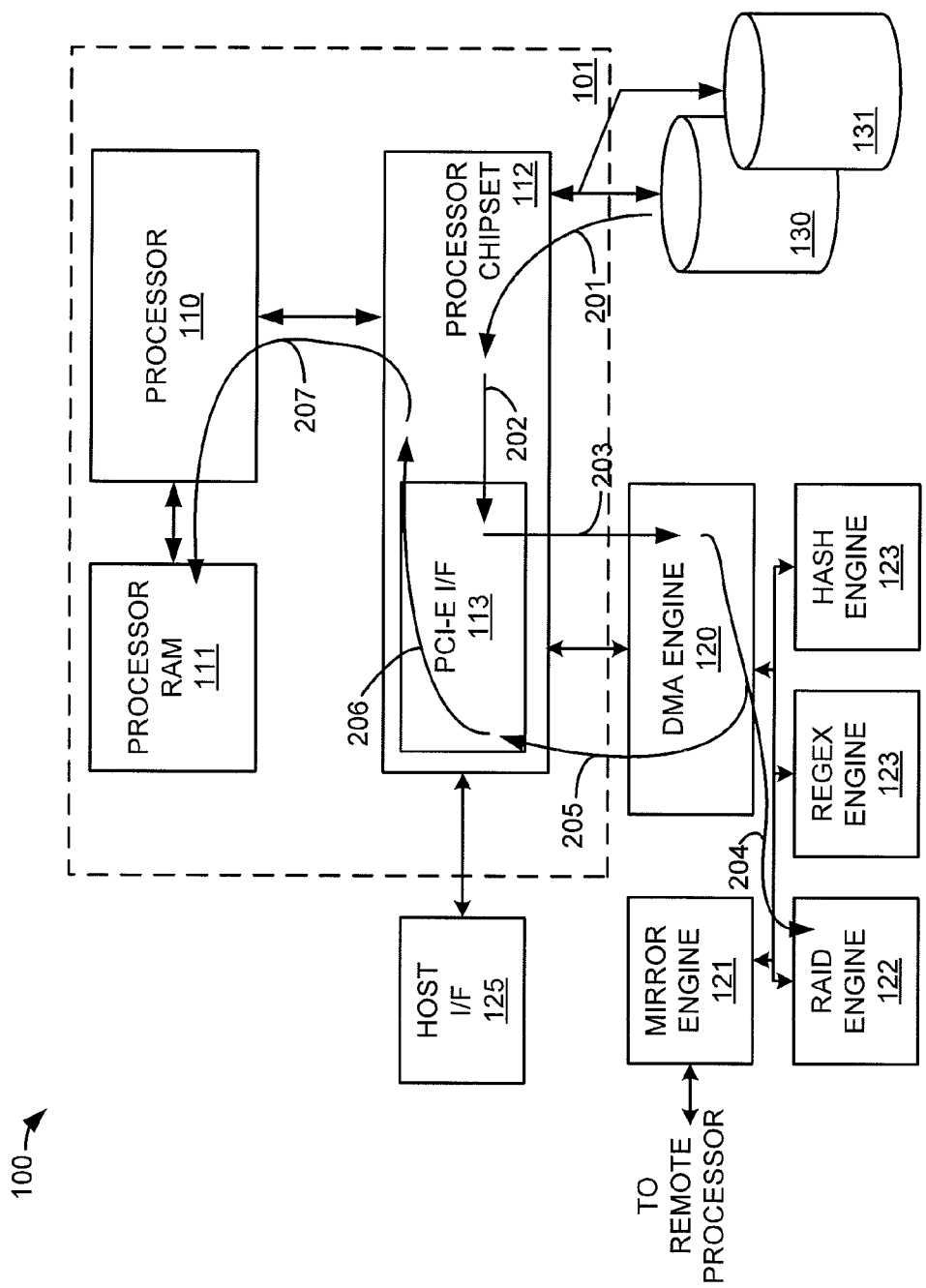
FIG. 2 is a block diagram illustrating data flows that perform simultaneous intermediate proxy DMA.

FIG. 2 is a block diagram illustrating data flows that perform simultaneous intermediate proxy DMA. FIG. 2 illustrates an example simultaneous DMA operation that concurrently transfers data from disk drive 130 to processor RAM 111 and RAID engine 122.

In FIG. 2, a first DMA operation is configured to transfer data from disk drive 130 to DMA engine 120. This DMA operation is configured as a DMA operation to memory locations associated with DMA engine 120. In other words, DMA engine 120 either has, or simulates, a block of memory. This memory may appear as peripheral memory in a PCI-express address space. This first DMA operation is shown in FIG. 2 by arrows 201, 202, and 203. Arrow 201 shows data transfer from disk drive 130 into processor chipset 112. Arrow 202 shows data transfer into PCI-express interface 113. Arrow 203 shows data transfer from PCI-express interface 113 to DMA engine 120 via a PCI-express channel.

DMA engine 120 may transfer the data it receives to one or more hardware functions. This is shown, for example, by arrow 204 which runs from DMA engine 120 to RAID engine 122.

A second DMA operation is configured to transfer data from DMA engine 120 to Processor RAM 111. This DMA operation is configured as a DMA operation to memory locations associated with processor 110 and processor RAM 111. In other words, DMA engine 120 completes the DMA operation from disk drive 130 to a block of processor RAM 111, on motherboard 101, that is directly readable and writeable by processor 110. The second DMA operation is shown in FIG. 2 by arrows 205, 206, and 207. Arrow 205 shows data received via arrow 203 being transferred from DMA engine 120 to PCI-express interface 113 via a PCI-express channel. Arrow 206 shows data transfer out of PCI-express interface 113 into the remaining portion of processor chipset 112. Arrow 207 shows data transfer from processor chipset 112 to processor RAM 111 via processor 110. In embodiment, this data transfer is a DMA operation controlled by DMA engine 120.

It should be understood that the data flows shown in FIG. 2 are for illustrative purposes. DMA operations can be configured to send blocks of data from processor RAM 111 to any peripheral device including DMA engine 120, mirror engine 121, RAID engine 122, regex engine 123, hash engine 124, host interface 125, and disk drives 130-131. In addition, DMA engine 120 may send or receive data to/from more than one of mirror engine 121, RAID engine 122, regex engine 123, host interface 125, and hash engine 124. Other DMA configurations that allow DMA engine 120 to concurrently mirror read/write data to processor memory 111 and one or more of mirror engine 121, RAID engine 122, regex engine 123, hash engine 124, and host interface 125 are possible.

FIG. 3 is a flowchart illustrating a method of transferring data. The steps illustrated in FIG. 3 may be performed by one or more elements of DMA system 100.

A first block of the data is transferred from a peripheral device to an address range in peripheral memory address space (302). For example, a block of data may be transferred from host interface 125 to an address range in PCI-express address space that is associated with DMA engine 120. Concurrently with transferring the first block to an address range in peripheral memory address space, the first block of data is transferred to an address range in processor memory address space (304). For example, simultaneously or concurrently with receiving the first block of data, DMA engine 120 may transfer that block of data to processor RAM 111 using a DMA operation. This DMA operation may follow the data flows shown by arrows 205, 206, and 207. This DMA operation may be performed on the same PCI-express channel as the data being received in block 302.

The first block of data is transferred to a hardware function (306). For example, DMA engine 120 may transfer the first block of data to RAID engine 122. In another example, DMA engine 120 may transfer the first block of data to one or more of mirror engine 121, RAID engine 122, regex engine 123, hash engine 124, and/or host interface 125. FIG. 3 illustrates a DMA operation from a peripheral device to processor RAM 111. It should be understood that a DMA operation from processor RAM 111 to a peripheral device which is mirrored to a hardware function by DMA engine 120 is also contemplated.

Figure 4:
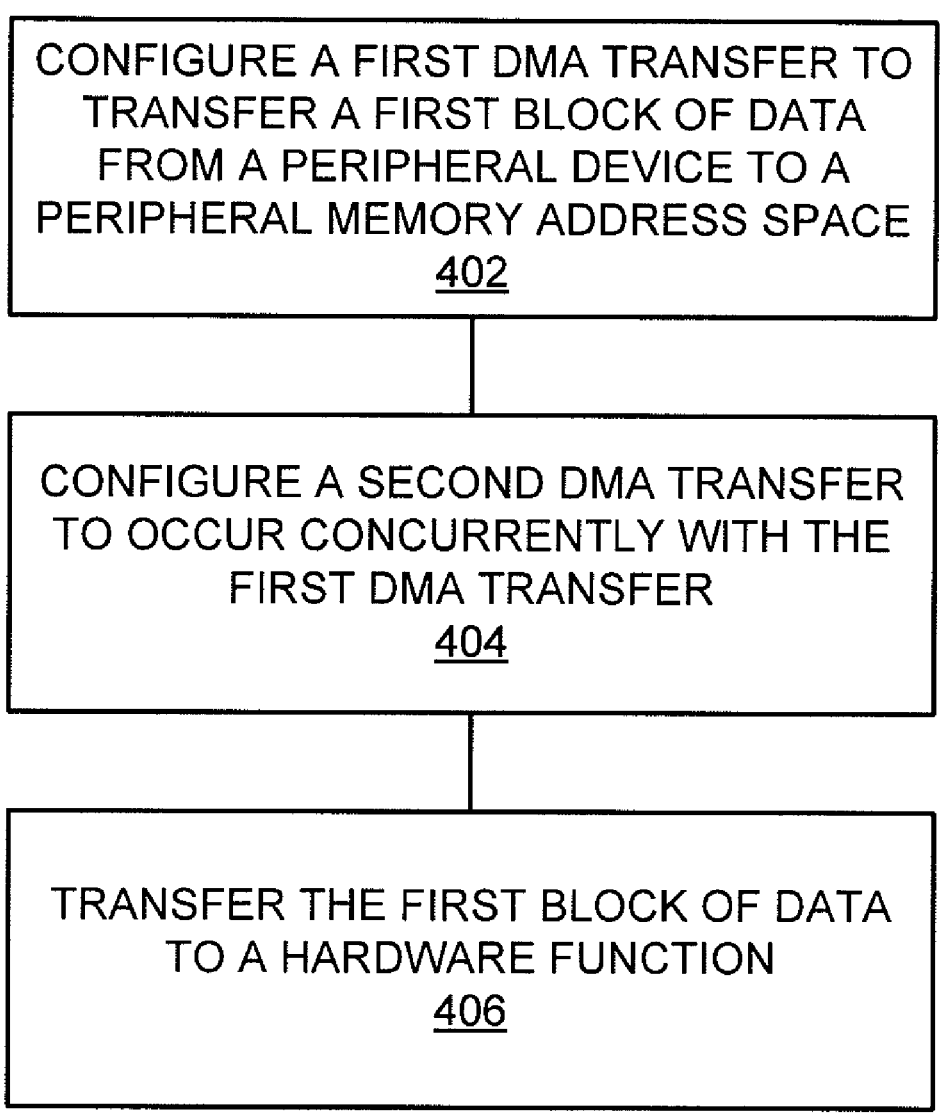
FIG. 4 is a flowchart illustrating a method of mirroring DMA data to a hardware function.

FIG. 4 is a flowchart illustrating a method of mirroring DMA data to a hardware function. The steps illustrated in FIG. 4 may be performed by one or more elements of DMA system 100.

A first DMA transfer is configured to transfer a first block of data from a peripheral device to a peripheral memory address space (402). For example, DMA system 100 may configure a DMA transfer to send data from disk drive 130 to DMA engine 120. A second DMA transfer is configured to occur concurrently with the first DMA transfer (404). For example, DMA system 100 may configure a DMA transfer to occur concurrently with the DMA transfer configured in block 402. This DMA transfer may send data from DMA engine 120 to processor RAM 111.

The first block of data is transferred to a hardware function (406). For example, DMA engine 120 may transfer the first block of data to RAID engine 122. In another example, DMA engine 120 may transfer the first block of data to one or more of mirror engine 121, RAID engine 122, regex engine 123, hash engine 124, and/or host interface 125. This transfer operation may occur simultaneously or concurrently with the first and/or second DMA operations.

FIG. 5 is a flowchart illustrating a method of mirroring DMA data to a hardware function. The steps illustrated in FIG. 5 may be performed by one or more elements of DMA system 100.

A first DMA transfer is configured to transfer a first block of data from a processor memory address space to a peripheral memory address space (502). For example, DMA system 100 may configure a DMA transfer to send data from processor RAM 111 to DMA engine 120. A second DMA transfer is configured to occur concurrently with the first DMA transfer (504). For example, DMA system 100 may configure a DMA transfer to occur concurrently with the DMA transfer configured in block 502. This DMA transfer may send data from DMA engine 120 to a peripheral device such as disk drive 130, host interface 125, or both.

The first block of data is transferred to a hardware function (506). For example, DMA engine 120 may transfer the first block of data to RAID engine 122. In another example, DMA engine 120 may transfer the first block of data to one or more of mirror engine 121, RAID engine 122, regex engine 123, hash engine 124, and/or host interface 125. This transfer operation may occur simultaneously or concurrently with the first and/or second DMA operations.

The systems, drives, processors, engines, interfaces, and functions described above may be implemented with or executed by one or more computer systems. The methods described above may be stored on a computer readable medium. Many of the elements of DMA system 100 may be, comprise, or include computers systems. This includes, but is not limited to processor 110, processor chipset 112, PCI-E interface 113, DMA engine 120, mirror engine 121, RAID engine 122, regex engine 123, hash engine 124, disk drive 130 and disk drive 131.

Figure 6:
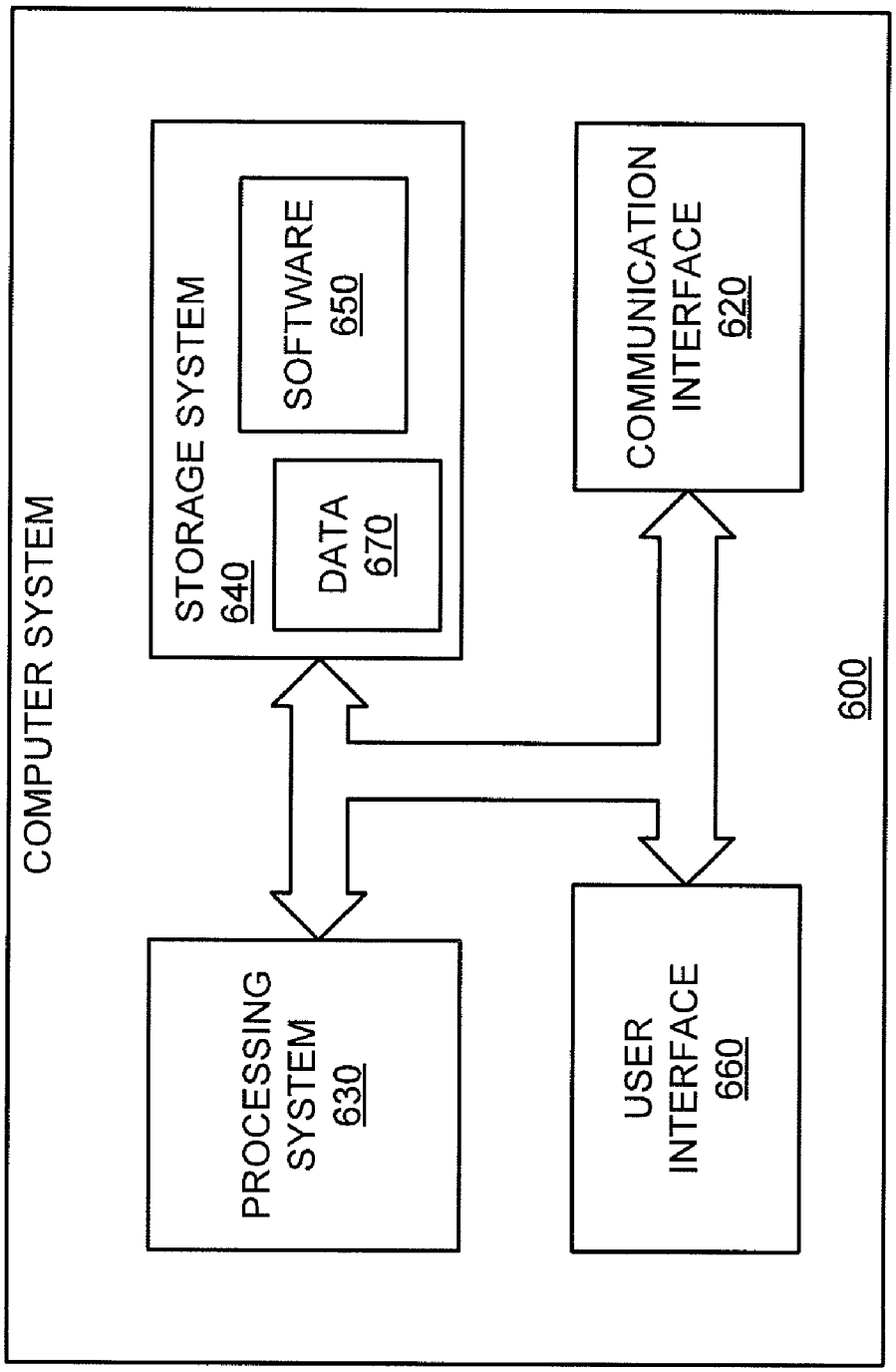
FIG. 6 is a block diagram of a computer system.

FIG. 6 illustrates a block diagram of a computer system. Computer system 600 includes communication interface 620, processing system 630, storage system 640, and user interface 660. Processing system 630 is operatively coupled to storage system 640. Storage system 640 stores software 650 and data 670. Processing system 630 is operatively coupled to communication interface 620 and user interface 660. Computer system 600 may comprise a programmed general-purpose computer. Computer system 600 may include a microprocessor. Computer system 600 may comprise programmable or special purpose circuitry. Computer system 600 may be distributed among multiple devices, processors, storage, and/or interfaces that together comprise elements 620-670.

Communication interface 620 may comprise a network interface, modem, port, bus, link, transceiver, or other communication device. Communication interface 620 may be distributed among multiple communication devices. Processing system 630 may comprise a microprocessor, microcontroller, logic circuit, or other processing device. Processing system 630 may be distributed among multiple processing devices. User interface 660 may comprise a keyboard, mouse, voice recognition interface, microphone and speakers, graphical display, touch screen, or other type of user interface device. User interface 660 may be distributed among multiple interface devices. Storage system 640 may comprise a disk, tape, integrated circuit, RAM, ROM, network storage, server, or other memory function. Storage system 640 may be a computer readable medium. Storage system 640 may be distributed among multiple memory devices.

Processing system 630 retrieves and executes software 650 from storage system 640. Processing system 630 may retrieve and store data 670. Processing system 630 may also retrieve and store data via communication interface 620. Processing system 630 may create or modify software 650 or data 670 to achieve a tangible result. Processing system may control communication interface 620 or user interface 660 to achieve a tangible result. Processing system 630 may retrieve and execute remotely stored software via communication interface 620.

Software 650 and remotely stored software may comprise an operating system, utilities, drivers, networking software, and other software typically executed by a computer system. Software 650 may comprise an application program, applet, firmware, or other form of machine-readable processing instructions typically executed by a computer system. When executed by processing system 630, software 650 or remotely stored software may direct computer system 600 to operate as described herein.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of transferring data, comprising:
    copying, by a PCI-express interface, using a PCI-express channel, a first block of data from a peripheral device to a DMA engine in an address range in a peripheral memory address space of the peripheral device;
    concurrently with said copying by the PCI-express interface, using the PCI-express channel, to the DMA engine, of said first block of data from the peripheral device to the DMA engine copying, by the DMA engine, using the PCI-express channel, the first block of data to an address range in processor memory address space; and
    concurrently with said copying by the PCI-express interface, using the PCI-express channel, to the DMA engine, of said first block of data from the peripheral device to the DMA engine, copying, by the DMA engine, the first block of data to a mirror engine, wherein the mirror engine copies said first block of data to a remote memory associated with a remote second processor, said remote memory in an address range in a peripheral memory address space of the remote second processor.

2. A method of mirroring direct memory access (DMA) data to a hardware function, comprising:
    configuring a first DMA transfer to copy, by a PCI-express interface, using a PCI-express channel, a first block of data from a peripheral device to a DMA engine in a peripheral memory address space of the peripheral device;
    configuring a second DMA transfer to occur concurrently with the first DMA transfer, the second DMA transfer being configured to copy, by the DMA engine, using the PCI-express channel, said first block of data from the DMA engine to a processor memory address space; and
    copying, by the DMA engine, said first block of data to a mirror engine concurrently with the first DMA transfer;
    wherein the mirror engine copies said first block of data to a remote memory associated with a remote second processor, said remote memory in an address range in a peripheral memory address space of the remote second processor.

3. A non-transitory computer readable medium having instructions stored thereon for mirroring direct memory access (DMA) data to a hardware function, that, when executed by a computer, at least instruct the computer to:
    configure a first DMA transfer to copy, by a PCI-express interface, using a PCI-express channel, a first block of data from a peripheral device to a DMA engine in a peripheral memory address space of the peripheral device;
    configure a second DMA transfer to occur concurrently with the first DMA transfer, the second DMA transfer being configured to copy, by the DMA engine, using the PCI-express channel, said first block of data from the DMA engine to a processor memory address space; and copy, by the DMA engine, said first block of data to a mirror engine concurrently with the first DMA transfer; wherein the mirror engine copies said first block of data to a remote memory associated with a remote second processor, said remote memory in an address range in a peripheral memory address space of the remote second processor.

* * * * *